(12) United States Patent
Müeller et al.

(10) Patent No.: US 8,074,502 B2
(45) Date of Patent: Dec. 13, 2011

(54) PART FOR MEASURING FORCES OR PRESSURES, AND SENSOR COMPRISING SUCH A PART

(75) Inventors: Michael Müeller, Rickenbach-Attikon (CH); Andrea Bertola, Zurich (CH); Kay Unzicker, Jestetten (DE)

(73) Assignee: Kistler Holding, AG, Winterthur (CH)

( * ) Notice: Subject to any disclaimer, the term of this patent is extended or adjusted under 35 U.S.C. 154(b) by 0 days.

(21) Appl. No.: 12/744,226

(22) PCT Filed: Nov. 24, 2008

(86) PCT No.: PCT/CH2008/000490
§ 371 (c)(1),
(2), (4) Date: May 21, 2010

(87) PCT Pub. No.: WO2009/067833
PCT Pub. Date: Jun. 4, 2009

(65) Prior Publication Data
US 2010/0251808 A1    Oct. 7, 2010

(30) Foreign Application Priority Data
Nov. 26, 2007   (CH) ........................................ 1834/07

(51) Int. Cl.
*G01M 15/08*   (2006.01)
(52) U.S. Cl. .................................................. 73/114.19
(58) Field of Classification Search ............... 73/114.16, 73/114.18, 114.19, 114.21
See application file for complete search history.

(56) References Cited

U.S. PATENT DOCUMENTS

| | | | |
|---|---|---|---|
| 7,712,444 B2* | 5/2010 | Kern et al. | 123/145 A |
| 7,759,612 B2* | 7/2010 | Last et al. | 219/260 |
| 2006/0218997 A1* | 10/2006 | Yamada et al. | 73/115 |
| 2007/0228030 A1* | 10/2007 | Boucard et al. | 219/270 |
| 2007/0295710 A1* | 12/2007 | Yamada et al. | 219/270 |
| 2009/0026889 A1* | 1/2009 | Wolfer et al. | 310/338 |
| 2009/0165739 A1* | 7/2009 | Kern et al. | 123/145 R |
| 2009/0242540 A1* | 10/2009 | Itoh et al. | 219/267 |

FOREIGN PATENT DOCUMENTS

| | | |
|---|---|---|
| EP | 1460403 | 9/2004 |
| EP | 1557654 | 7/2005 |
| WO | 2004/070334 | 8/2004 |
| WO | 2006/089446 | 8/2006 |
| WO | 2007/096205 | 8/2007 |

OTHER PUBLICATIONS

International Search Report on Patentability, issued Jan. 15, 2010.
English translation of International Preliminary Examination Report on Patentability, issued Jun. 8, 2010.

* cited by examiner

*Primary Examiner* — Eric S McCall
(74) *Attorney, Agent, or Firm* — Dority & Manning, P.A.

(57) ABSTRACT

A part to be mounted into force or pressure sensors includes an annular measuring element made of piezoelectric material. First and second electrodes rest against respective opposite sides of the measuring element and are provided with wires. An electrically insulating transmission member laterally adjoins the first electrode, across from the measuring element. Another electrically insulating insulation member laterally adjoins the second electrode, across from the measuring element. All components are mounted within the part in such a way as to be centered relative to each other. The external face of the transmission member and the external face of the insulation member which face away from and run parallel to the electrodes are designed in a very planar manner, having a levelness of less than 10 μm.

17 Claims, 3 Drawing Sheets

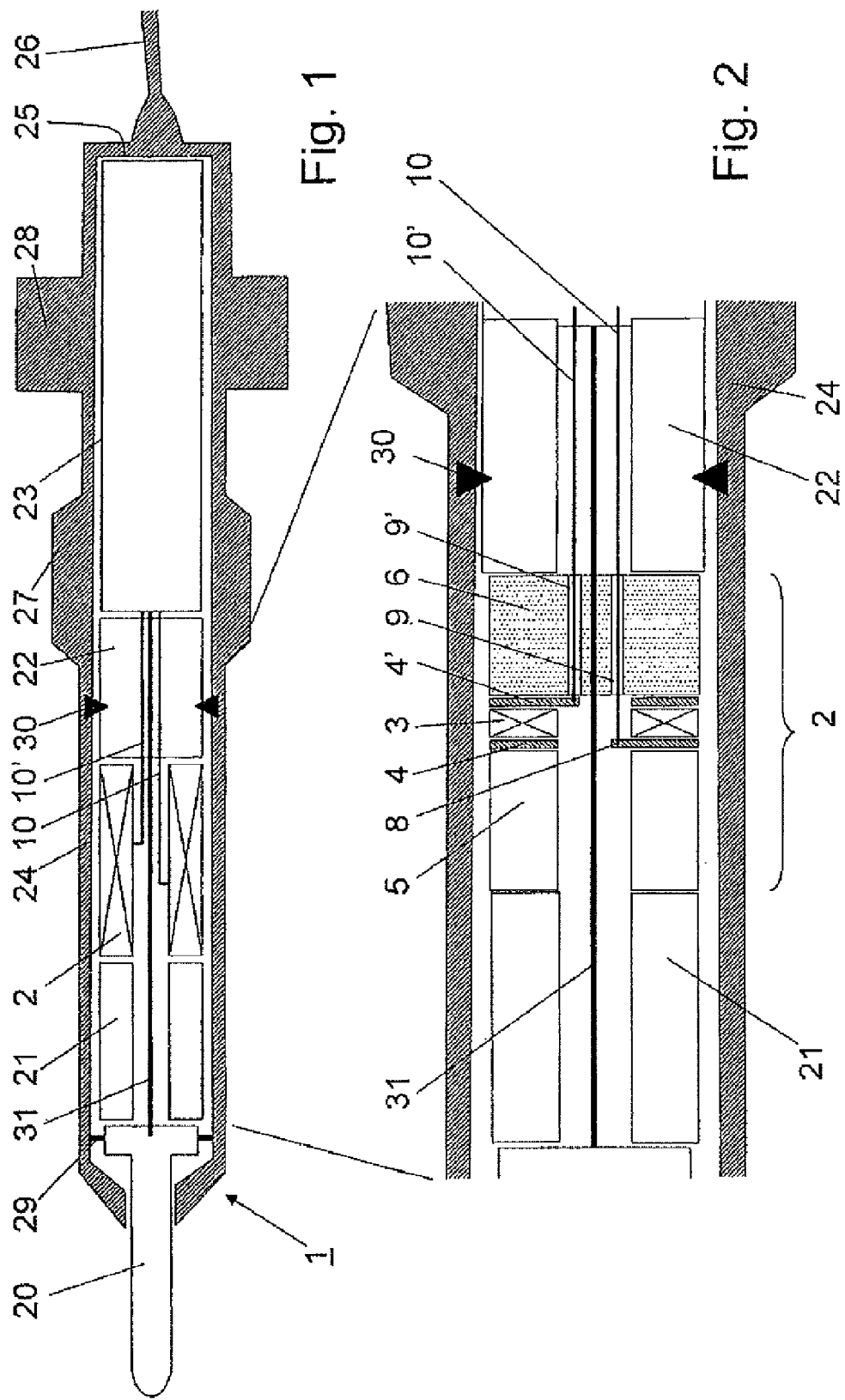

PART FOR MEASURING FORCES OR PRESSURES, AND SENSOR COMPRISING SUCH A PART

CROSS-REFERENCE TO RELATED APPLICATIONS

This application claims priority to International Application Serial No. PCT/CH2008/000490 filed Nov. 24, 2008, which claims priority to Swiss Application No. CH 1834/07 filed Nov. 26, 2007.

TECHNICAL FIELD

The invention relates to a part for the installation into force or pressure sensors, comprising a measuring element made of piezoelectric material according to the preamble of the independent claim as well as a sensor comprising such a part.

BACKGROUND

For example, sensors comprising such parts are used for the measurement in combustion chambers, for example in glow plugs.

From WO 2006/089446, a part of the type described above is known. It is particularly suitable for the use in glow plugs. However, said part has to be provided with insulated wires to the electrodes, or the insulation thereof with respect to each other has to be achieved with a complex part which engages with said part. These measures are very expensive.

WO 2007/096205 describes a glow plug which for example may use a part of the type described in WO 2006/089446. It comprises a centering element with a centering portion which has to center the part in the glow plug. In order to accomplish the centering, however, the difficulty is to manufacture said centering portion and the surface to which the part adjoins in the required levelness.

OBJECTS AND SUMMARY OF THE PRESENT INVENTION

It is the object of the present invention to provide a part for the installation into force or pressure sensors of the type initially mentioned above which is constructed in such a manner that a centered installation into a sensor is made possible without the need for any further centering parts. A further object of the present invention is to provide a part which does not require complex parts for insulating the wires for the electrodes.

The object is solved by the features of the independent claim and the dependent claims.

The part of the present invention comprises a measuring element made of piezoelectric material, on each of both sides thereof one electrode with the wires attached thereto, and a transmission member which laterally adjoins the first electrode and an insulation member which laterally adjoins the second electrode. Transmission member and insulation member are both electrically insulating. All said components are mounted within a part in such a way that they are centered relative to each other. The idea underlying the present invention resides in the fact that the external surfaces of the part exhibit a levelness of less than 10 µm with respect to the axis thereof. Thus, the part may be installed into a sensor in such a manner that it is positioned at said surfaces without requiring further components for centering. Thus, additional components may be saved which apart from cost benefits also renders the saving of space. Thus, sensors may be built smaller.

Further preferred embodiments of the invention are described in the dependent claims. A particular further embodiment of the present invention resides in the fact that the insulation member has at least two bores, wherein the wires penetrate the insulation member in such a manner that they are insulated with respect to each other. Thereby, they cannot come into contact with each other and are always electrically insulated relative to each other.

BRIEF DESCRIPTION OF THE DRAWINGS

In the following, the invention is illustrated in more detail with respect to the drawings.

FIG. 1 shows a schematic representation of a preferred arrangement of a glow plug according to the present invention in a cross-sectional view;

FIG. 2 shows a schematic representation of a section of a preferred glow plug in a cross-sectional view, in the region of the part according to the present invention;

DETAILED DESCRIPTION OF EXEMPLARY EMBODIMENTS

Figure 3:
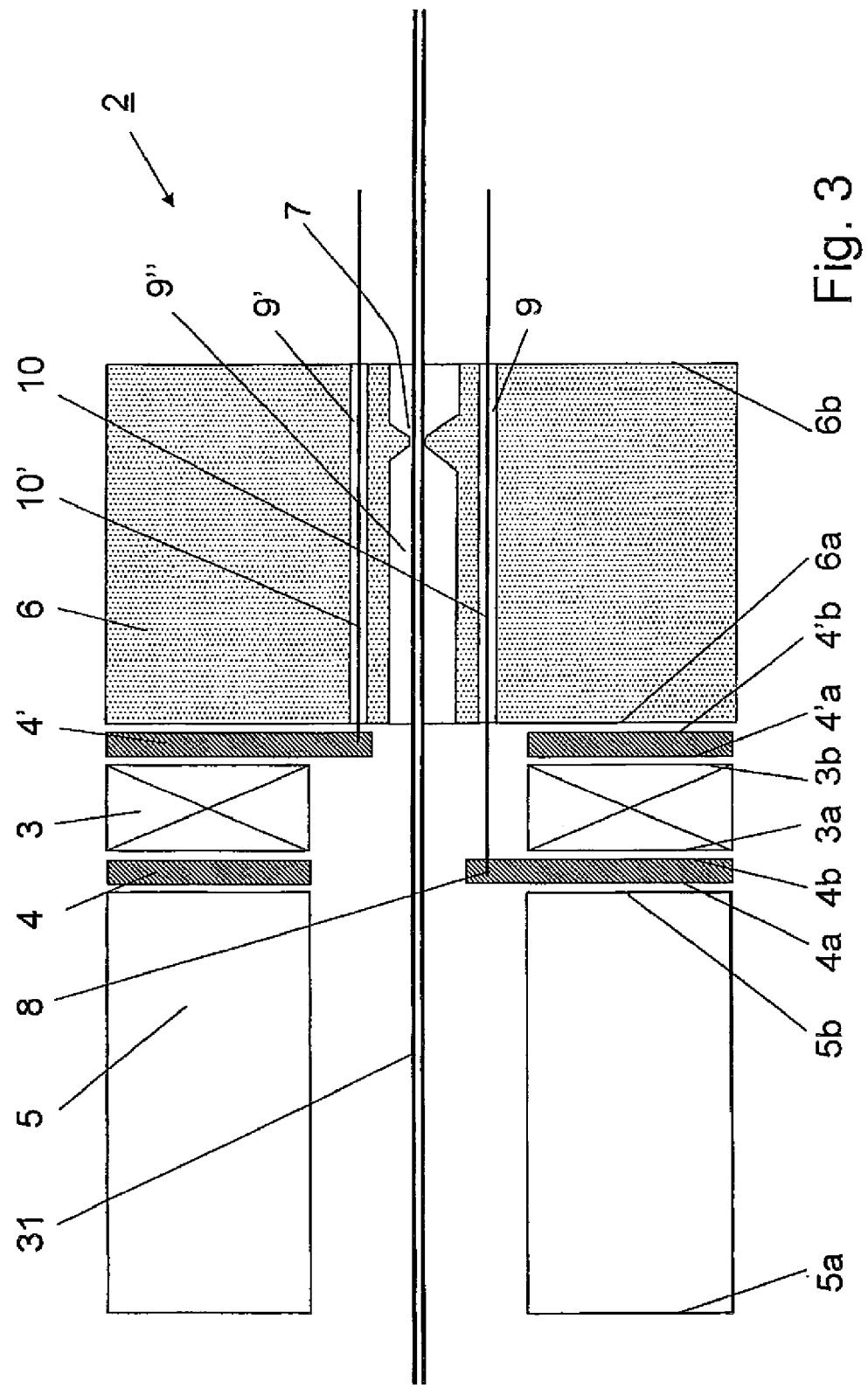
FIG. 3 shows a schematic representation of the part according to the present invention having a glow current wire.

FIG. 1 shows a possible embodiment as an application of a part 2 according to the present invention in a glow plug 1. The Figure shows a schematic representation of a preferred glow plug 1 in a cross-sectional view. This comprises a housing 24, into the front region of which a glow pin 20 is inserted in such a manner that it protrudes therefrom. Immediately behind glow pin 20 there may be a force transmission sleeve 21, behind which a part 2 according to the present invention is arranged. As an alternative thereto, part 2 may also be arranged directly behind the glow pin. Behind said part 2 there is a fixation 22, which rests against the connection element 23 at the rear side. Connection element 23 is attached to a shoulder 25 of the housing 24 at its rear end. Alternative constructions having the same effects are also possible. In particular, the fixation 22 may be welded to the housing 24 at a welding point 30, whereby no force is transmitted to the shoulder 25 of the housing 24 through connection element 23 any longer. During a measurement, a pressure in the combustion chamber acts upon part 2 through glow pin 20 in a direct manner or via force transmission sleeve 21, wherein said part converts the pressure into a measuring signal. Finally, said measuring signal is directed via two wires 10, 10' from part 2 through wiring 26 to an evaluation device (not shown).

For mounting glow plug 1 in a bore of a cylinder head intended for this purpose housing 24 generally has a thread 27 and a hexagon 28 as a contact face for a tool. In this case, welding point 30 is arranged in the region between thread 27 and glow pin 20. Instead of being attached at housing 24, welding point 30 may preferably be attached at an intermediate sleeve not shown, which applies the prestress and which is separated from housing 24 apart from its attachment thereto, in order to prevent defective effects on a measurement by the stress of glow plug 1 during installation.

In the rearmost region of glow plug 1, there is the exit for wiring 26, which aside from the wires 10, 10' for part 2 also comprises the current supply for a glow current wire 31 which is designated for the heating of glow pin 20. In the front region of glow plug 1 there is a membrane 29 which seals the interior 24 against the combustion chamber. By means of this membrane 29 the desired prestress may also be applied to part 2.

Preferably, at least one part of the force transmission sleeve 21 is made of a heat insulating material, so that part 2 is less exposed to thermal stress from the combustion chamber.

FIG. 2 shows a detailed section of FIG. 1 in the region of part 2. Preferably, the different components of part 2 essentially have the same outer diameters. A measuring element 3 makes up the core of part 2. It consists of piezoelectric material, for example of a piezoelectric crystal or of piezoelectric ceramics. Said measuring element 3 is surrounded by a first electrode 4 and a second electrode 4' on both sides in axial direction. At these electrodes 4, 4' wires 10, 10' are attached at the contact sites 8. Laterally adjoining the first electrode 4 across from measuring element 3, an electrically insulating transmission member 5 is attached, and laterally adjoining the second electrode 4' across from measuring element 3 an electrically insulating insulation member 6 is attached. All said components 3, 4, 4', 5 and 6 are mounted within part 2 in such a manner, that they are centered relative to each other. Said mounting attachment may e.g. be provided by a film or a shrink hose surrounding these components.

In FIG. 3, part 2 is illustrated with glow current wire 31. The surfaces of the components at the side of the combustion chamber are indicated with a, the surfaces thereof at the side of the connectors are indicated with b. According to the present invention, the external face of the transmission member 5a as well as the external face of the insulation member 6b, which proceed from the electrodes 4, 4' in a manner facing away from and running parallel to said electrodes, are arranged very planar with a levelness of less than 10 μm, preferably less than 5 μm. Subsequently, this enables a simple and centered installation into a sensor. It has been shown that the centering element used in WO 2007/096205 at its contact face to part 2 may be designed only with considerable effort in the required levelness. Further, the embodiment of centering elements and centering portions having a correspondingly high exactness may entirely be omitted. Thus, the embodiment described herein is much cheaper.

Preferably, the internal surfaces of part 2 which proceed in a parallel manner to said surfaces 5a, 6b, namely both sides of the measuring element 3a, 3b, both sides of both electrodes 4a, 4b, 4'a, 4'b as well as the internal side of the transmission member 5b and the internal side of the insulation member 6a are also designed in a very planar manner having a levelness of less than 10 μm.

In a preferred embodiment, the insulation member 6 exhibits at least 2 bores 9, 9', through which the wires 10, 10' penetrate the insulation member in such a manner that they are insulated relative to each other. This makes a separate insulation of the wires 10, 10' unnecessary. Thus, it can be avoided that a centering member such as described in WO 2007/096205 has to be inserted, which inter alia functioned to provide an insulation of said wires 10, 10'. The two bores 9, 9' may also be connected with each other, as long as the insulation of the wires 10, 10' proceeding therein is ensured. In particular, these may be segments of the same bore, as long as the wires 10, 10' are mounted in such a manner that they are spaced from each other. The space in the center of the transmission member 5 which has been newly formed due to the elimination of the centering member may now be used for other purposes, e.g. for a heating coil.

The transmission member 5 and the insulation member 6 meet further important functions. Preferably, at least one of these members 5, 6 is an expansion member which compensates thermal expansions of housing 24. Additionally, the two members 5, 6 perform the function of mechanically protecting the measuring element 3 with the electrodes on both sides 4, 4'. According to the present invention, these are pressed parts, generally made of ceramics, preferably of Aluminum oxide.

In a preferred embodiment, at least the transmission member 5 is also a thermal insulator. This has the advantage, that part 2 arranged behind is exposed to a lower temperature and thus has to meet lower requirements.

In particular, each electrode 4, 4' may also be integrally formed with its adjacent transmission member 5 or its adjacent insulation member 6, respectively. The function of the electrodes is to accumulate the charges appearing upon exposure to pressure or force on both sides of the measuring element 3 and to transmit them to the contact sites 8 intended for this purpose. Preferably, these contact sites 8 are located in the internal region of part 2. This is advantageous since generally there is hardly any space between part 2 and housing 24 at the external face for leading away the wires.

In particular, an attachment to part 2 has to make sure that the said components 3, 4, 4', 5 and 6 are not dislocated until part 2 is installed in a sensor or a glow plug 1. At that time, part 2 is prestressed which excludes a later dislocation of said components. Following the installation into a glow plug 1 or a sensor said attachment may be omitted.

FIG. 3 shows the part when it is penetrated by glow current wire 31. This is the case when it is installed into a glow plug. In this application, isolation member 6 has a further bore 9''', through which glow current wire 31 may be carried. Preferably, this bore 9''' has a local tapering 7, which may guide glow current wire 31 in a close-fitting manner. Thereby, glow current wire 31 is held tight and withstands later vibrations. Preferably, said tapering 7 is closer to the external face 6b than to the internal face 6a of insulation member 6. Thus, the thermal impact zone is further away from measuring element 3 whereby the temperature at said element may be held low. However, the bore 9''' with tapering 7 may also have a different geometrical design.

Figure 4:
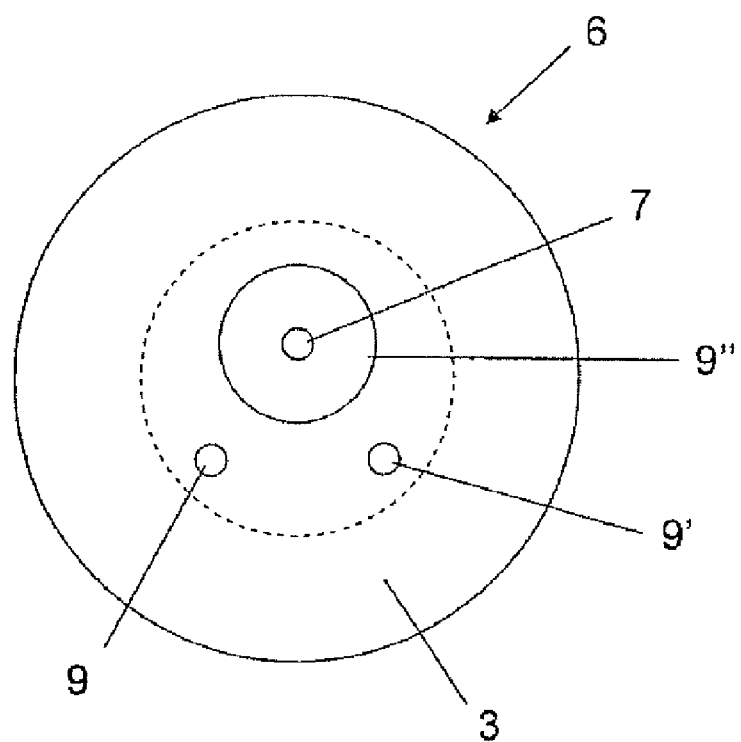
FIG. 4 a schematic representation of an insulation part in a lateral view.

As shown in FIG. 4, said tapering 7 or bore 9''' itself are preferably arranged in the insulation member 6 in an eccentric manner. Thus, upon assembly of glow pin 20 with glow pin wire 31 on the one hand and part 2 with the wires 10, 10' on the other hand, the location of the two bores 9, 9' is determined in an unambiguous manner. This is necessary for an automatic connection of the wires 10, 10' with the wiring intended for this purpose.

Specifically, such a part 2 described hereinabove is designed to be assembled to pressure sensors for internal combustion engines, in particular glow plugs in a standard assembly. This results in a simple and cheap assembly as well as high process safety for the manufacture of the highly precise planar surfaces.

The embodiment of part 2 described hereinabove according to the present invention is mainly characterized by its simplicity and the cheap manufacture resulting therefrom, which may be done in an automated manner. Prior to the application of the attachment, all components of part 2 are centered. The attachment enables that the centering is maintained until part 2 is installed in the sensor and prestressed. Thus and due to the planar external surfaces, the effort of centering upon installation into glow plug 1 is unnecessary. By means of this arrangement, part 2 is also ground-isolated in contrast to other parts for the same applications, in which one of the electrodes is connected to the housing. In many countries said ground-isolation is required for all parts in an automobile in accordance to regulation.

Advantageously, part 2 is arranged in the front region of glow plug 1, which is located in the region of the glow plug bore of the cylinder head in the built-in state. Accordingly, part 2 is preferably arranged in front of or in the region of thread 27. On the one hand, it is thus ensured that it is not heated in excess of 220° C. since the cylinder head is cooled. A further advantage of said installation position is that the measuring error is the lower the closer part 2 is with respect to the pressure chamber, i.e. the combustion chamber.

A further advantage of the frontal installation position of part 2 is that thus space is cleared for an integrated amplifier in the rear region of the glow pin, for example in the region of connecting element 23. Thereby, an output signal which has already been amplified may be transmitted via wiring 26.

However, the installation of part 2 into the front region implies that part 2 has an outer diameter of maximum 5 mm to be accommodated in a glow plug 1 having a M8 thread 27. Typically, the length of the part is between about 6 and 15 mm.

LIST OF REFERENCE NUMERALS

1 Glow plug
2 Part
3 Measuring element
4 4' Electrode
5 Transmission member
6 Insulation member
7 Tapering
8 Contact site
9 9' 9" Bores
10 10' Wire
20 Glow pin
21 Force transmission sleeve
22 Fixation
23 Connecting element
24 Housing
25 Shoulder
26 Wiring
27 Thread
28 Hexagon
29 Membrane
30 Welding point
31 Glow current wire

The invention claimed is:

1. Part for the installation into force or pressure sensors comprising the following components:
   an annular measuring element made of piezoelectric material,
   first and second electrodes that rest against both sides of the measuring element and are provided with wires,
   an electrically insulating transmission member that laterally adjoins the first electrode across from measuring element and
   an electrically insulating insulation member that laterally adjoins the second electrode across from measuring element,
   wherein all said components are mounted within part so as to be centered to each other, and
   wherein the external face of the transmission member and the external face of the insulation member which face away from the electrodes and run parallel to them, are designed in a planar manner having a levelness of less than 10 μm.

2. Part according to claim 1, wherein also the internal faces of the part, namely both faces of the measuring elements, both faces of both electrodes as well as the internal face of the transmission member and the internal face of the insulation member, are parallel to the external face of the transmission member and the external face of the insulation member and are designed in a planar manner having a levelness of less than 10 μm.

3. Part according to claim 1, wherein the insulation member exhibits at least two bores, in which the wires penetrate through the insulation member in such a manner so as to be insulated to each other.

4. Part according to claim 1 for the use in a glow plug, wherein the insulation member has a further bore, through which a glow current wire is carried.

5. Part according to claim 4, wherein the bore has a local tapering which guides the glow current wire in a close-fitting manner.

6. Part according to claim 5, wherein said tapering is closer to the external face than to the internal face of the insulation member.

7. Part according to claim 5, wherein said tapering or the narrowest site of the further bore are arranged in the insulation member in an eccentric manner.

8. Part according to claim 1, wherein the transmission member and/or the insulation member are integrally formed with their adjacent electrodes.

9. Part according to claim 1, wherein the transmission member and/or the insulation member consist of thermal insulating material.

10. Part according to claim 1, wherein the total diameter of the part is less than 5 mm.

11. Part according to claim 1, wherein the part is suitable for standard installation into a pressure sensor of internal combustion engines.

12. Part according to claim 1, wherein the part is operable up to 220° C.

13. Sensor for measuring of forces or pressures, the sensor comprising a part according to claim 1.

14. Sensor according to claim 13, wherein the sensor includes a glow plug comprising a housing, a glow pin, a glow current wire, a fixation and a thread.

15. Sensor according to claim 14, wherein the part is arranged between the glow pin and the thread.

16. Sensor according to claim 13, wherein the sensor includes a housing and an intermediate sleeve, wherein the intermediate sleeve contains the part and applies a prestress on the part and is separated from the housing except for the intermediate sleeve's attachment at the housing.

17. Part according to claim 11, wherein the part is suitable for standard installation into a glow plug.

* * * * *